US010944922B2

(12) United States Patent
Rotte et al.

(10) Patent No.: US 10,944,922 B2
(45) Date of Patent: Mar. 9, 2021

(54) HYBRID OUTPUT MULTIPLEXER FOR A HIGH FRAMERATE CMOS IMAGER

(71) Applicant: GVBB HOLDINGS S.A.R.L., Luxembourg (LU)

(72) Inventors: Jeroen Rotte, Breda (NL); Juul Josephus Johannes Van Den Heijkant, Breda (NL); Rik Visser, Everdingen (NL)

(73) Assignee: GVBB HOLDINGS S.A.R.L, Luxembourg (LU)

( * ) Notice: Subject to any disclaimer, the term of this patent is extended or adjusted under 35 U.S.C. 154(b) by 0 days.

(21) Appl. No.: 16/751,020

(22) Filed: Jan. 23, 2020

(65) Prior Publication Data

US 2020/0162684 A1    May 21, 2020

Related U.S. Application Data

(63) Continuation-in-part of application No. 16/389,772, filed on Apr. 19, 2019, which is a continuation of
(Continued)

(51) Int. Cl.
*H04N 5/3745* (2011.01)
*H04N 5/357* (2011.01)
(Continued)

(52) U.S. Cl.
CPC ......... *H04N 5/343* (2013.01); *H04N 5/23216* (2013.01); *H04N 5/347* (2013.01);
(Continued)

(58) Field of Classification Search
None
See application file for complete search history.

(56) References Cited

U.S. PATENT DOCUMENTS 8,471,315 B1    6/2013   Hynecek et al.
2005/0057674 A1   3/2005   Krymski et al.
(Continued)

FOREIGN PATENT DOCUMENTS

EP      1139658 A2    5/2005
JP    2010268529 A   11/2010

OTHER PUBLICATIONS

Non-Final Office Action dated Apr. 11, 2018, issued in U.S. Appl. No. 15/362,023.
(Continued)

*Primary Examiner* — Mark T Monk
(74) *Attorney, Agent, or Firm* — Arent Fox LLP (57) ABSTRACT

An imaging system is provided that includes a pixel array having a plurality of columns with rows of pixels and with each pixel having a plurality of photodiodes and a common readout circuit that stores respective accumulation voltages from each of the plurality of photodiodes. Moreover, the system includes row driver circuitry that control the pixel array for pixel addressing and readout, such that the respective accumulation voltages of the photodiodes is read out on a readout channel coupled to a bit line column, and a hybrid multiplexer that multiplexes and routes output signals from the pixel array to a video imaging device to be displayed thereon.

17 Claims, 9 Drawing Sheets

Related U.S. Application Data application No. 15/697,349, filed on Sep. 6, 2017, now Pat. No. 10,270,987, which is a continuation-in-part of application No. 15/362,023, filed on Nov. 28, 2016, now Pat. No. 10,270,997.

(60) Provisional application No. 62/385,204, filed on Sep. 8, 2016, provisional application No. 62/385,027, filed on Sep. 8, 2016.

(51) Int. Cl.
    *H04N 5/232*     (2006.01)
    *H04N 5/353*     (2011.01)
    *H04N 5/374*     (2011.01)
    *H04N 5/343*     (2011.01)
    *H04N 5/347*     (2011.01)
    *H04N 5/378*     (2011.01)

(52) U.S. Cl.
    CPC ......... *H04N 5/3532* (2013.01); *H04N 5/3575* (2013.01); *H04N 5/378* (2013.01); *H04N 5/3745* (2013.01); *H04N 5/37457* (2013.01)

(56) References Cited

U.S. PATENT DOCUMENTS

| | | |
|---|---|---|
| 2009/0108176 A1 | 4/2009 | Blanquart |
| 2010/0309340 A1 | 12/2010 | Border et al. |
| 2013/0057744 A1 | 3/2013 | Minagawa et al. |
| 2014/0263964 A1 | 9/2014 | Yang et al. |
| 2014/0333809 A1 | 11/2014 | Bock |
| 2016/0165159 A1 | 6/2016 | Hseih et al. |
| 2016/0353034 A1 | 12/2016 | Mauritzson et al. |
| 2018/0255255 A1* | 9/2018 | Lin ................ H04N 5/3577 |

OTHER PUBLICATIONS

International Search Report and Written Opinion issued in PCT/EP2017/072630 dated Nov. 28, 2017.

International Search Report and Written Opinion dated Aug. 16, 2018, regarding PCT/CA2018/050636.

\* cited by examiner

HYBRID OUTPUT MULTIPLEXER FOR A HIGH FRAMERATE CMOS IMAGER

CROSS REFERENCE TO RELATED APPLICATIONS

This application is a continuation-in-part of U.S. application Ser. No. 16/389,772, filed Apr. 19, 2019, which is a continuation of U.S. application Ser. No. 15/697,349, filed Sep. 6, 2017, and now issued as U.S. Pat. No. 10,270,987, which claims priority to U.S. Provisional Application Ser. No. 62/385,204, filed on Sep. 8, 2016. U.S. Pat. No. 10,270,987 is also a continuation-in-part of U.S. application Ser. No. 15/362,023, filed Nov. 28, 2016, and now issued as U.S. Pat. No. 10,270,997, which claims priority to U.S. Provisional Application Ser. No. 62/385,027, filed on Sep. 8, 2016. The entire contents of each of these applications is hereby incorporated by reference herein in their entirety.

TECHNICAL FIELD

The disclosure herein generally relates to CMOS images sensors, and, more particularly, to a hybrid output multiplexer for a high framerate Complementary Metal Oxide Semiconductor ("CMOS") imager.

BACKGROUND

Complementary metal oxide semiconductor ("CMOS") image sensors are widely used in digital cameras to produce digital images by converting optical signals into electrical signals. In operation, CMOS image sensors may convert an optical signal into an electrical signal using a multitude of pixels that each include a photodiode and a read-out circuit. The photodiode generates electric charges using absorbed light, converts the generated electric charges into an analog current, and delivers the analog current to the read-out circuit. The read-out circuit may convert the analog signal into a digital signal and may output the digital signal.

Figure 1:
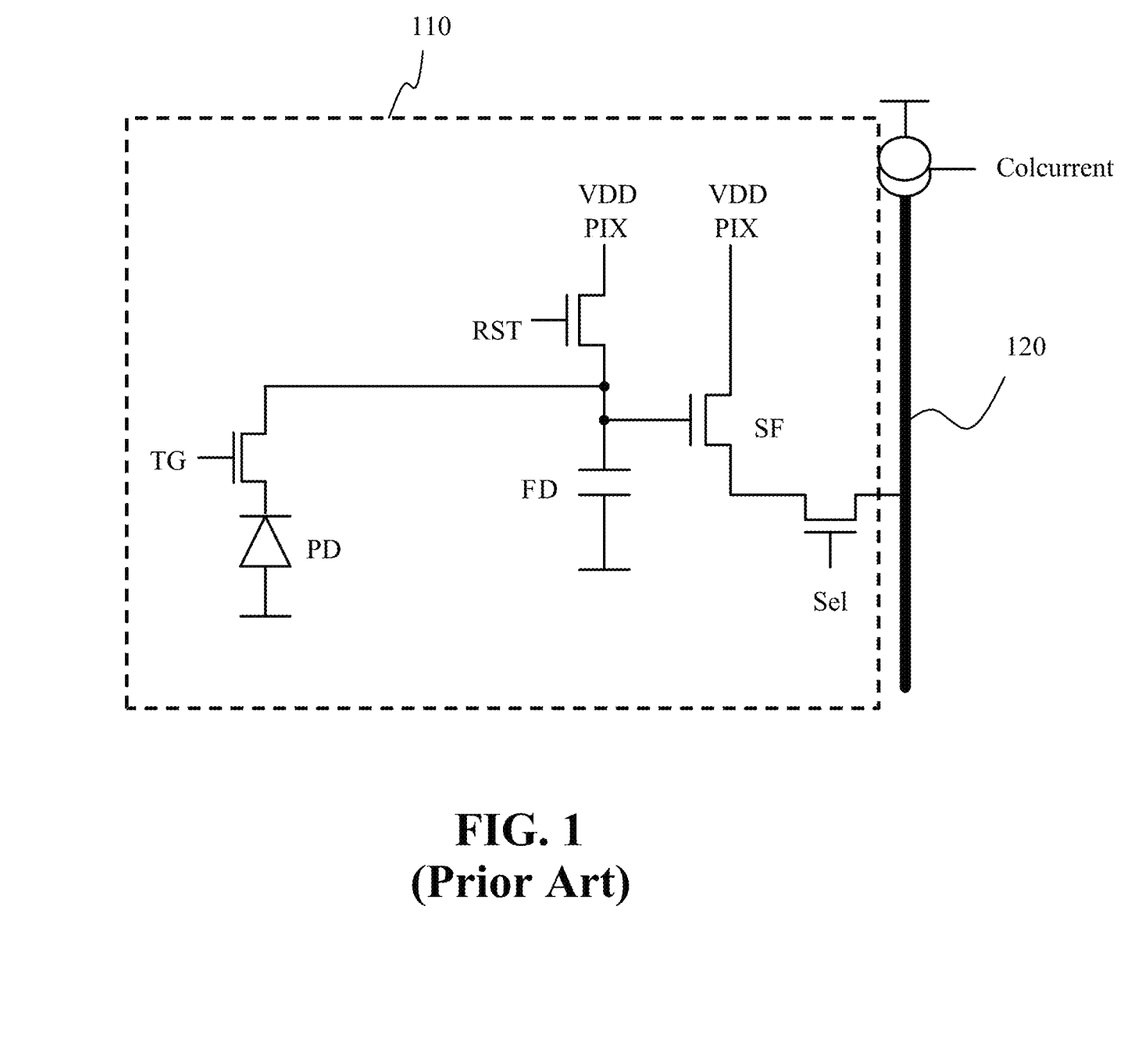
FIG. 1 illustrates a conventional design of a 4T pixel configuration of a CMOS image sensor connected to a column circuit.

Certain CMOS image sensor pixel circuits are formed using four transistors and are known and referred to as 4T image sensor pixels or "4T pixels." FIG. 1 illustrates an exemplary design of a 4T pixel 110 connected to a bit-line 120. As shown, the 4T CMOS image sensor pixel 110 includes a photodiode ("PD") that provides the photon to electron conversion, while a floating diffusion ("FD") point provides the electron to voltage conversion. The voltage per electron conversion of the FD is known as conversion gain ("CG") and is an important parameter for CMOS image sensors. Conversion gain boosts the pixel signal relative to the analog noise, thereby reducing the noise floor, and thereby enabling performance at lower light levels.

During operation, the pixel is reset when the reset transistor ("RST") and transfer gate ("TG") are turned on simultaneously. The RST signal will set the floating diffusion FD to a voltage level. Next, the transfer gate TG is turned off (disconnecting the photodiode PD and floating diffusion FD) and the photodiode PD is left to integrate light.

After integration, the signal measurement occurs. First, the reset transistor RST is turned on and off to reset the floating diffusion FD. Immediately after this, the reset level is sampled from the floating diffusion FD and stored on the column circuit, i.e., bit-line 120. Next, the transfer gate TG is turned on and off which allows charge on the photodiode PD to transfer to the floating diffusion (FD). Once the charge transfer is complete, this charge (the photodiode signal level plus the floating diffusion reset level) is measured and stored on bit-line 120 as well. Moreover, this charge will be an analog signal that is converted. However, these data signals will need to be multiplexed to an image sensor, which often requires multiplexing of a high amount of column A/D converters (e.g., 1056 ADCs) to a lower count of serializers/outputs, such as 8 or 16.

SUMMARY

Accordingly, a hybrid multiplexer is disclosed herein for routing a plurality of outputs signals from analog to digital converters coupled to a pixel array aspect. In an example aspect, the hybrid multiplexer includes a tristate multiplexer as a first stage that is configured to run at relatively slow speed. Moreover, the tristate multiplexer at this stage is convenient to avoid routing issues in the 4 metal layer 180 nm process. After a register stage, the data is multiplexed with a 6:1 multiplexer to the output to generate the image of the image data captured by the pixel array. The register stage is used to give the tristate multiplexer time to settle to the next value. Moreover, a 2:1 mux is used to daisy chain multiple of these stages, of which the 2× daisy chaining is configured to multiplex 132 ADC outputs.

In an exemplary embodiment, an imaging system is provided that includes a pixel array including a plurality of columns having a plurality of rows of pixels, with each pixel having a plurality of photodiodes and a common readout circuit configured to store respective accumulation voltages from each of the plurality of photodiodes; row driver circuitry configured control the pixel array for pixel addressing and readout; an image sensor controller configured to control the row driver circuitry to address the plurality of rows of pixels in the pixel array, such that the respective accumulation voltages of at least a portion of photodiodes of the plurality of rows is concurrently read out on a readout channel coupled to at least one bit line column; and a plurality of analog to digital converters coupled to the at least one bit line column and configured to convert output signals from the pixel array to a plurality of digital signals that correspond to the respective accumulation voltages of the at least portion of photodiodes of the plurality of rows. Moreover, in the exemplary embodiment, the system includes a hybrid multiplexer configured to multiplex and route the plurality of digital signals to a video imaging device to be displayed thereon. In this aspect, the hybrid multiplexer comprises a first stage including a plurality of tristate multiplexers; a second stage including a plurality of registers configured to receive digital outputs signals from the first stage and store values therein; and a third stage including at least one digital multiplexer coupled to the plurality of registers and serially route the digital output signals from the second stage to a control unit for producing a digital image of image data captured by the pixel array on the video imaging device. Moreover, the second stage of the hybrid multiplexer is configured to store the digital outputs to provide a settling time for the first stage to receive a next value of the plurality of digital signals output from the plurality of analog to digital converters. In another exemplary aspect, the third stage of the hybrid multiplexer is configured to daisy chain the respective outputs of the first and second stages to multiplex the plurality of digital signals to the control unit. Yet further, the first stage of the hybrid multiplexer includes a plurality of 11:1 tristate multiplexers, and the third stage of the hybrid multiplexer includes at least one 6:1 digital multiplexer.

According to another exemplary embodiment of the imaging system disclosed therein, the plurality of rows of pixels comprise a linear configuration and have a symmetrical layout that is identical to one another other.

According to yet another exemplary embodiment of the imaging system disclosed therein, each pixel in the pixel array comprises a plurality of transfer gates that are each coupled to a corresponding photodiode of the plurality of photodiodes and the common readout circuit is further configured to output the accumulation voltage of each of the plurality of photodiodes to the readout channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In one configuration, the number of rows and columns of photodiodes in a pixel array of a CMOS image sensor may both be doubled. As a result, there may be four time of photodiodes in an image area compared with the number of photodiodes when the image area is filled with 4T pixels. In such a configuration, each pixel area that may originally be occupied by one 4T pixel may contain four photodiodes. Such a pixel that contains four photodiodes may be referred to as a 4T shared pixel, or simply a shared pixel.

Figure 2:
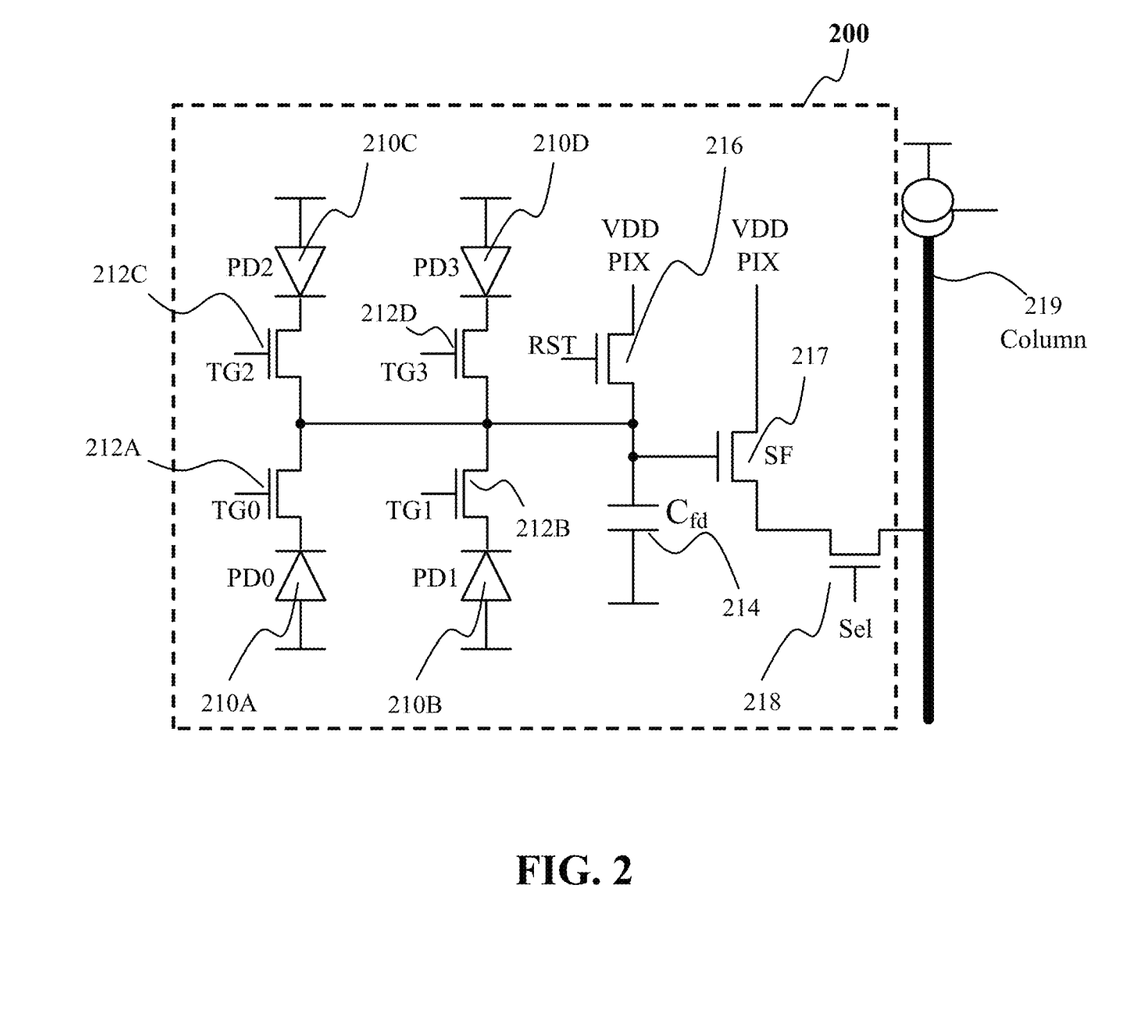
FIG. 2 illustrates a schematic diagram of an exemplary 4T shared pixel CMOS image sensor that can be implemented in connection with an exemplary embodiment.

FIG. 2 illustrates a schematic diagram of an exemplary 4T shared pixel CMOS image sensor that can be implemented in connection with an exemplary embodiment. The shared pixel 200 includes a similar configuration as the 4T pixel described above except that it includes four sub-pixels, e.g., photodiodes 210A, 210B, 210C and 210D (also shown as PD0-PD3) that are each driven by a respective transfer gate (shown as TG0-TG3). The transfer gates, which can be CMOS transistors in an exemplary aspect, are identified by reference numerals 212A, 212B, 212C and 212D. As shown, each of the transfer gates 212A-112D shares a common readout circuit and is connected to floating diffusion point, 214, i.e., capacitor Cfd. As further shown, both transistor 216 (reset transistor) and transistor 217 have drains connected to the voltage source of the pixel (e.g., VDD PIX). The source of reset transistor 216 is connected to the floating diffusion point 214 and the source of transistor 217 is connected to the drain of the select transistor 218. The source of select transistor 218 is connected to the column circuit 219.

As will be discussed in more detail below, each sub-pixel (i.e., each of photodiodes PD0-PD3) can be read out separately by activating its corresponding transfer gate. Thus, to read out photodiode 210A, the transfer gate 212A is turned on/activated. Similarly, photodiode 210B is read out by activating transfer gate 212B, and so forth. In some instances, multiple sub-pixels will be read out at the same time as a single read operation by activating the respective transfer gates simultaneously.

In order to take advantage of the higher resolution provided by the shared pixels, each photodiode of a shared pixel may need to be read out individually. To read out each photodiode of a shared pixel individually, four wires may be needed to address each photodiodes individually. However, having four wires connected to a shared pixel may degrade the performance of the shared pixel, e.g., by blocking the optical paths of the shared pixel, and/or by detrimentally affecting the conversion gain, fill factor, sensitivity of the image sensor. Thus, it may be desirable to reduce the interconnection/wiring associated with a shared pixel while maintaining the capability to read out each photodiode of the shared pixel individually.

Figure 3:
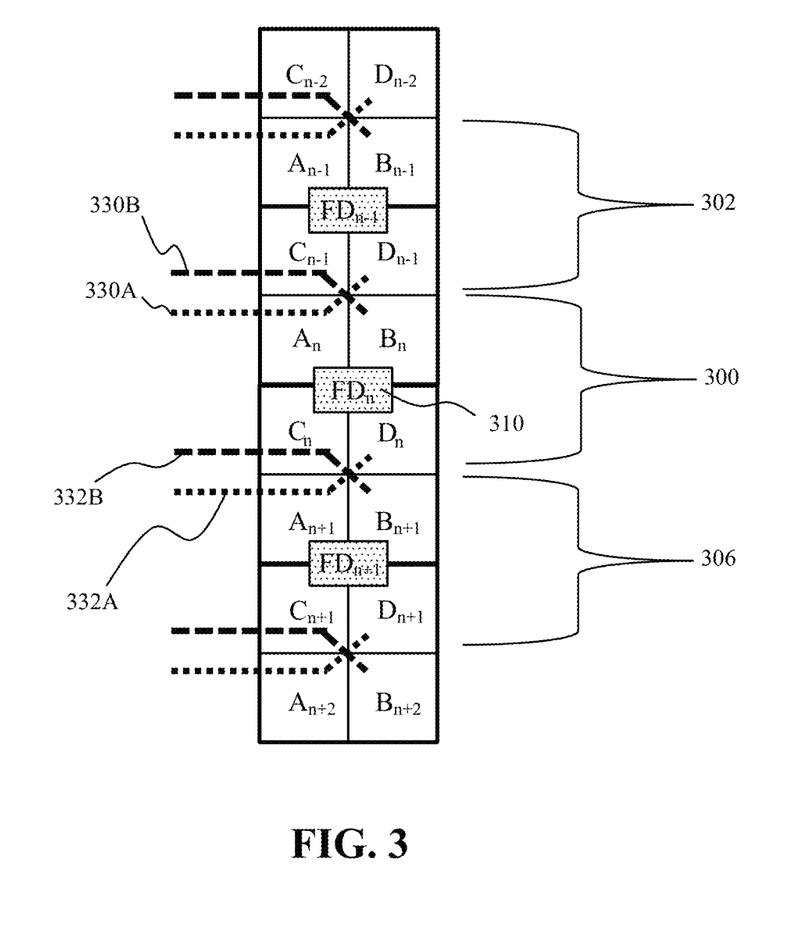
FIG. 3 illustrates a block diagram of a conceptual view of a portion of a pixel array according to an exemplary embodiment.

FIG. 3 illustrates a block diagram of a conceptual view of a portion of a pixel array according to an exemplary embodiment. In particular, the column shown in this figure includes a shared pixel 300 that includes sub-pixels $A_n$, $B_n$, $C_n$ and $D_n$. In one configuration, the shared pixel 300 may be the shared pixel 200 discussed above, and the sub-pixels $A_n$, $B_n$, $C_n$ and $D_n$ may correspond to sub-pixels 210A-210D discussed above. Moreover, as described above, each 4T shared pixel includes a floating diffusion point, which is illustrated as $FD_n$ and denoted by 310. As further shown, a shared pixel 302 in the preceding row is formed by sub-pixels $A_{n-1}$, $B_{n-1}$, $C_{n-1}$ and $D_{n-1}$ (including floating diffusion point $FD_{n-1}$) and two sub-pixels $C_{n-2}$ and $D_{n-2}$ are formed above the shared pixel 302. Similarly, the row following the shared pixel 300 includes a shared pixel 306 formed by sub-pixels $A_{n+1}$, $B_{n+1}$, $C_{n+1}$ and $D_{n+1}$ (including floating diffusion point $FD_{n+1}$), and two sub-pixels $A_{n+2}$ and $B_{n+2}$ are formed below the shared pixel 306. For purposes of this disclosure, the row for each shared pixel can be considered as rows n−2, n−1, n, n+1 and n+2. For example, the shared pixel 300 is on row n, the shared pixel 302 is on row n−1, and the shared pixel 306 is on row n+1.

As described above, each transfer gate is activated for two adjacent sub-pixels in the vertical direction (relative to the array) that are in different adjacent pixel rows (e.g., in rows n−1 and n, or in rows n and n+1). Thus, the transfer gates for sub-pixels $C_{n-1}$ and $B_n$ may first be activated by transfer gate signal 330B. Since sub-pixels $C_{n-1}$ and $B_n$ are in different rows, i.e., different shared pixels, the values of the sub-pixels $C_{n-1}$ and $B_n$ may be read out during the same readout period. Next, a transfer gate signal 330A may be applied to activate sub-pixels $A_n$ and $D_{n-1}$. After the activation by the pair of transfer gate signals 430A and 430B, the CMOS image sensor has performed a readout of sub-pixels $A_n$, $B_n$, $C_{n-1}$, and $D_{n-1}$.

Referring further to FIG. 3, during the next cycle of readout, transfer gate signals 332B and 432A may be applied to activate the corresponding sub-pixels. In a similar manner as described above, the transfer gates for sub-pixels $C_n$ and $B_{n+1}$ may first be activated by transfer gate signal 332B. Next, transfer gate signal 332A may be applied to activate sub-pixels $A_{n+1}$ and $D_n$. Accordingly, after the activation by the pair of transfer gate signals 332A and 332B, the CMOS image sensor has performed a readout of sub-pixels $C_n$, $D_n$, $A_{n+1}$ and $B_{n+1}$.

Figure 4:
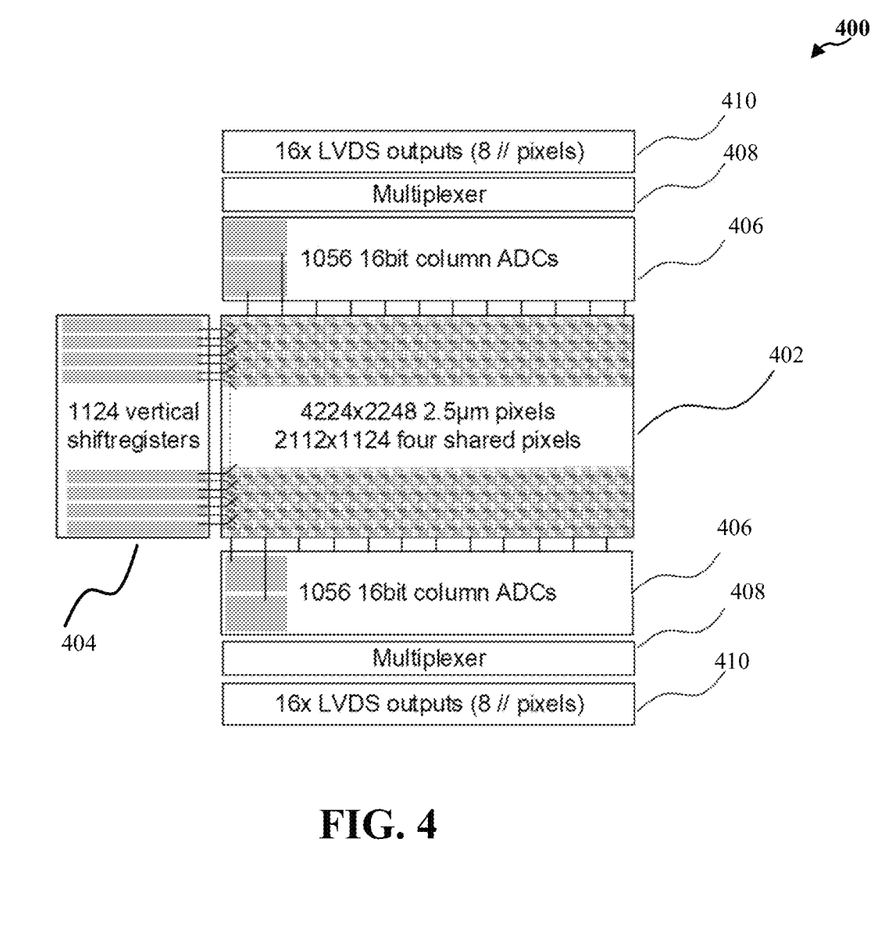
FIG. 4 illustrates a schematic diagram of an architecture of a CMOS image sensor according to an exemplary embodiment.

FIG. 4 illustrates a schematic diagram of an architecture of a CMOS image sensor 400 that includes the pixel array described above according to an exemplary embodiment. As shown in FIG. 4, the CMOS image sensor 400 includes a pixel array region 402, which includes a multitude of shared pixels described above. Each shared pixel in the exemplary pixel array 402 includes sub-pixels (i.e., photodiodes PD0-PD3). In one specific exemplary configuration, each shared pixel may be the shared pixel 200 described above in FIG. 2.

As shown, in an exemplary embodiment, the pixel array 402 preferably comprises 4224×2248 4T shared pixels having pixel pitch of about 2.5 μm. The pixel pitch describes the density of the shared pixels. In other words, the pixel array 402 has 4224 gates (V) and 2248 columns (H). The CMOS image sensor 400 uses an image diagonal of 11.0 mm for all scanning format as required for a ⅔" optical format. In one exemplary embodiment, the CMOS image sensor 400 may use an external programmable timing generator to enable flexible vertical addressing. The external timing generator provides an opportunity to use various binning patterns and various readout schemes.

According to the exemplary embodiment, there are a plurality of columns of subpixels in the array with pairs of columns each having a respective pair of subpixels that together form a pixel. Moreover, the pixel array 402 preferably comprises vertical shift registers 404 that are 1124 lines deep, i.e., 1124 rows in the pixel array 402. The shift registers 404 are configured to drive the control signals for pixel activation and output according to an exemplary aspect. Moreover, as shown in the embodiment, the platform for the array is limited to 1124 rows times four shared pixels or 4496 lines at full resolution.

As explained above with reference to FIG. 2, to read out a value of a particular photodiode, the respective transfer gate must be activated. In this instance, transfer gate signals are applied to sub-pixels in adjacent rows, to read out two values concurrently. During the same readout period, the control circuit also activates two transfer gate signals for the shared pixels. In this case the transfer gate signals are in the same row of the shift register.

Each of reset signals RST, select signals SEL, and transfer gate activation signals are cycled through in rows in response to control signals received from a row decoder as would be understood to one skilled in the art. Moreover, it should be appreciated that there are corresponding reset, select and transfer gate activation signals for each row in the pixel array. Thus, the rows are cycled through to be sampled as would be understood to one skilled in the art. An example of a configuration and system for driving the control signals for a CMOS pixel array is described in U.S. Pat. No. 10,270,987, issued Apr. 23, 2019, the contents of which are hereby incorporated by reference.

Moreover, it should be noted that each pixel typically operates at higher voltages as compared to shift registers 404. Therefore, in one configuration the output of each shift register 404 is level-shifted from the lower voltages to the higher voltages using a plurality of level shifters. In this configuration, the level shifters are used as an interface with the pixel array 402. In addition, for each line there may be a separate row driver. In one exemplary embodiment, a row driver comprises a shift register and a level shifter. It should be noted that the SEL, RST and TG may have their own level shifters. In some configurations, multiple TGs may be cross-connected to one level shifter. A level shifter can be driven by one or more shift registers. An example of a row driver configuration is disclosed in U.S. patent application Ser. No. 16/750,602, filed Jan. 23, 2020, entitled "Imager with Vertical Row Addressing", the entire contents of which are hereby incorporated by reference. As used herein the term "rowtime" or "row time" refers to the time required to charge and output image data from each row in the pixel array 402. In other words, row time represents time between two separate data transfers.

As shown in FIG. 4, the CMOS image sensor 400 may include a plurality of ADCs (Analog to Digital Converters) 406 coupled on the opposing sides of the pixel array 402. Generally, each pixel of the pixel array 402 is configured by a pixel circuit and an ADC. The pixel circuit outputs charge signals corresponding to the amount of received light by converting the charge signals to corresponding voltage in the floating diffusion, which is in turn sent to the ADC as an analog pixel signal SIG. The ADC converts the analog pixel signal SIG supplied from the pixel circuit into a digital signal.

In one configuration, each column of shared pixels has one charge-domain multi-slope column ADC. In one configuration, the multi-slope column ADC consists of two sample blocks, an OTA, comparator CMP, digital control and a plurality of charge pumps with different step sizes. Placing the ADCs on top and bottom of the pixel array 402 and having a column pitch of 5 μm yields a width of about 10 μm per ADC per side.

In general, the frame rate of an image sensor is an important parameter. Developments for faster frame rates are needed for imaging of fast moving and ultra-short events for scientific and industrial applications. In one configuration, the frame rate is determined by the slowest of the pixel sampling, amplification and A/D conversion processes. This requires additional sample-and-hold stages in the column amplifier structure, which may be difficult to make and area consuming for small column pitches. In addition, in large arrays, the pixel sampling process can be slowed down due to the large capacitive loads of the pixel column bus. According to an exemplary embodiment, to enable the highest possible frame rate, processes like light integration, column sampling, A/D Conversion and output multiplexing may run in parallel. In this embodiment, every ADC of the plurality of ADCs 406 on the column may be sampling on one capacitor while simultaneously may be converting on a second capacitor to maximize the column settling time and to maximize the ADC conversion time per row readout.

As shown in FIG. 4, 1056 column ADCs 406 can be arranged on opposing sides of the pixel array 402 in the exemplary aspect. Moreover, the double-sided pitch of the column ADCs is 5 µm, so there is 1 ADC per (shared pixel) column. Since there are 1056 ADCs 406 on each side, collectively all 2112 ADCs 406 generate 16 bit data at max 1.7 MS/s/ADC.

According to an exemplary embodiment of the present invention, outputs of the ADCs 406 are connected to respective multiplexers 408. Generally, an analog tristate multiplexer is compact and has low power requirements. However, the long wires of the analog multiplexer typically result in low bandwidth performance. On the other hand, a full digital shift register is fast, but such register typically is not power efficient due to the high frequency (f) for all data. In addition, such digital implementation leads to routing congestion due to the high number of inputs. Accordingly, in one exemplary embodiment, the pair of multiplexers 408 may have hybrid (analog/digital) topology, as described below in conjunction with FIG. 3. Advantageously, in this embodiment, the CMOS image sensor 400 having a pixel rate of 3.6 Gpix/s and a resolution of 16 b from the ADCs 406, may generate the output (data rate) at 58 Gb/s. The output of the CMOS image sensor 400 may be in a serialized digital low-voltage differential signaling (LVDS) format. Such a LVDS format is particularly useful for facilitating the interfacing with a minimum number of interconnects, which can be an important consideration for minimizing the number of wires attached to the CMOS image sensor 400. In one configuration, the image sensor 400 has 32 LVDS outputs 410 with programmable serialization factors. The maximum output data rate of such image sensor 400 is 1.8 Gb/s per LVDS-channel.

Figure 5:
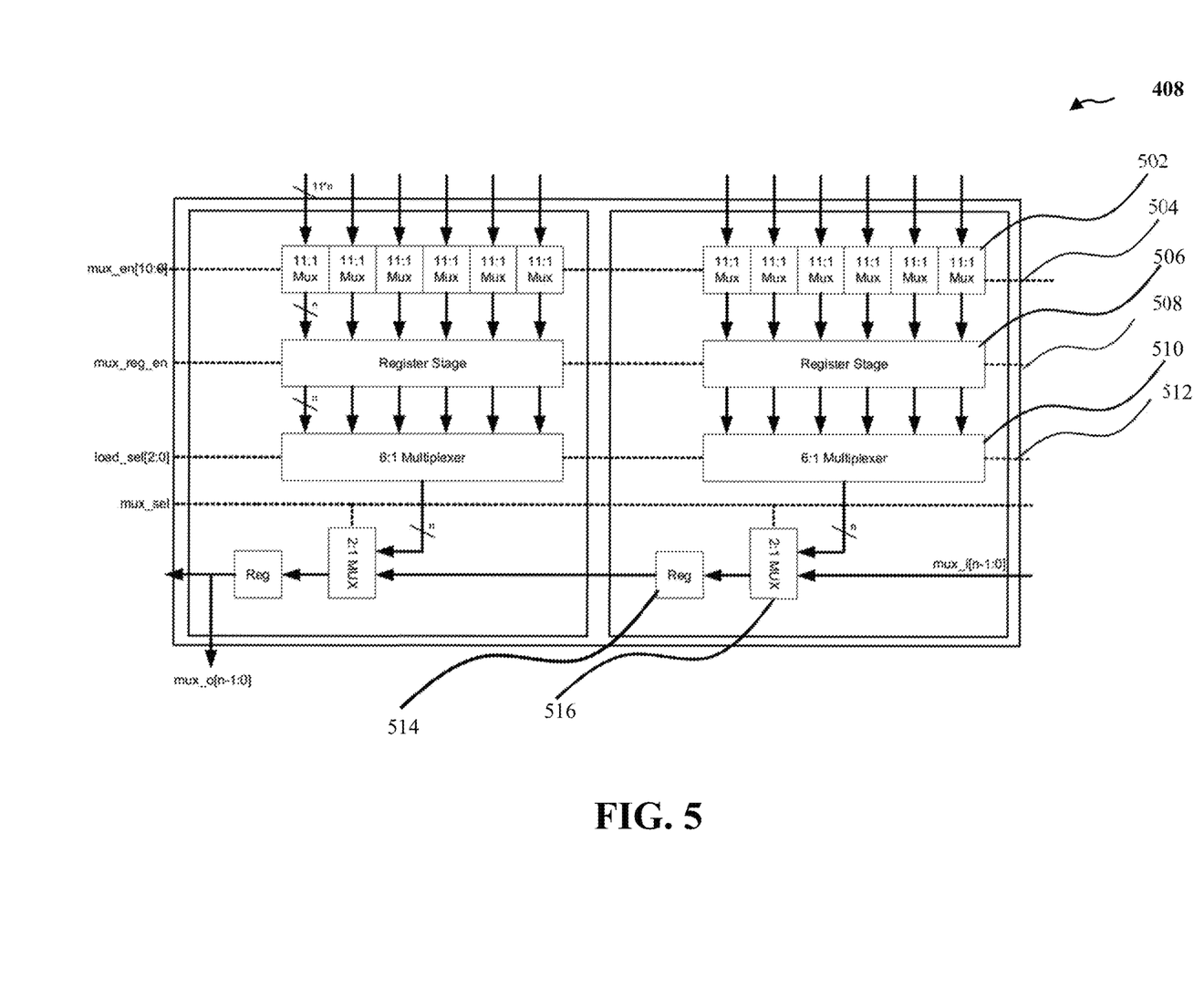
FIG. 5 illustrates a block diagram of a hybrid output multiplexer of the CMOS image sensor shown in FIG. 4 according to an exemplary embodiment.

FIG. 5 illustrates a block diagram of a hybrid output multiplexer 408 of the CMOS image sensor 400 according to an exemplary embodiment. In one configuration, the hybrid output multiplexer 408 is implemented as a multi-stage multiplexer comprising a combination of tristate multiplexers 502, digital multiplexers 510 and a digital shift register 514. As shown in FIG. 5, at a first stage, the hybrid output multiplexer 408 includes a plurality of 11:1 tristate multiplexers 502. In an exemplary aspect, each tristate multiplexer 502 receives 11 input signals from the ADCs 406 and 11 selection signals from a control unit and selects one output signal. In one configuration, the 11:1 multiplexers are analog tristate multiplexers, which can be relatively small and fast. In this configuration, the 11:1 multiplexers treat the digital output of the ADCs 406 as an analog signals. As further shown in FIG. 5, a first bus 504 is connected to the plurality of the tristate multiplexers 502 for sending enable signals thereto.

In one exemplary embodiment, the next stage may comprise a register stage. At this stage, a plurality of digital registers 506 receive output from the plurality of tristate multiplexers 502 to latch the current tristate multiplexer values. This stage allows the next values for the tristate multiplexers 502 to settle. A control line 508 is connected to the plurality of digital registers 506 for sending register stage enable signals.

A second stage of the multi-stage multiplexing operation disclosed herein includes at least one digital 6:1 multiplexers 510, which receives inputs from the plurality of registers 506. The select signal is provided via a bus 512 to the 6:1 multiplexers 510 which selects between six outputs generated by six 11:1 multiplexers 502. According to an embodiment of the present invention, all outputs of the 6:1 multiplexers 510 are loaded into a two register deep shift register 514 using the 2:1 multiplexer 516. After loading, the data in the shift register 514 is shifted to the output of the hybrid output multiplexer 408. In the illustrated example, the shift register 514 is two registers deep. However, the depth of the shift register 514 can be selected based on at least active outputs and available bandwidth parameters. This last stage also enables passive 2× daisy chaining to trade the required output bandwidth with the number of active output lanes. In some embodiments, the 7:1 multiplexers may replace a combination of the 6:1 multiplexer 510 and 2:1 multiplexer 516 shown in FIG. 5.

It is an advantage of this embodiment that the 132:1 hybrid output multiplexer 408 has only two registers running at the highest clock rate and 12 registers running at the highest clock rate divided by 12. In contrast, all 132 registers run at the highest clock rate in a conventional digital shift register multiplexer implementation. The output of the hybrid output multiplexer 408 is propagated to the LVDS output channels 410 as shown in FIG. 4 discussed above.

Figure 6:
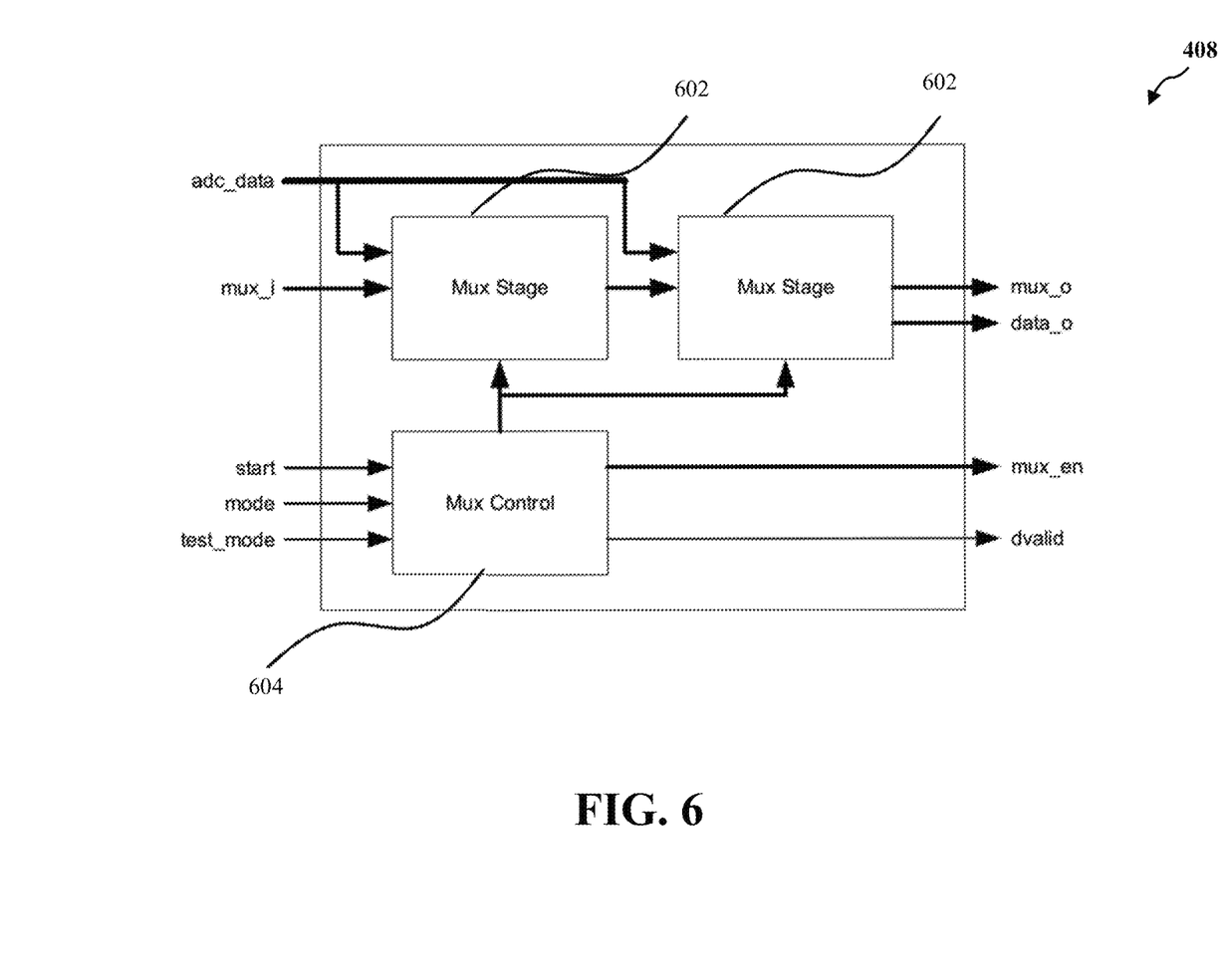
FIG. 6 illustrates a more detailed block diagram of the hybrid multiplexer according to an exemplary embodiment.

FIG. 6 illustrates a more detailed block diagram of the hybrid multiplexer 408 according to an exemplary embodiment. As shown in FIG. 6, the hybrid multiplexer 408 contains two identical multiplexing operation blocks 602 and a control block 604. The multiplexing operation blocks 602 generally correspond to the MUX stages shown in FIG. 5 and contain a register to latch the data from the tristate 11:1 multiplexer 502, a 6:1 multiplexers 510, and a 2:1 multiplexer 516 or (7:1 multiplexer) and a final register which is used to load or shift the data. The control block 604 shown in FIG. 6 is configured to generate the pulses for the hybrid multiplexer 408 to multiplex 132, 264 or 528 parallel ADC data outputs to a single data stream.

Figure 7:
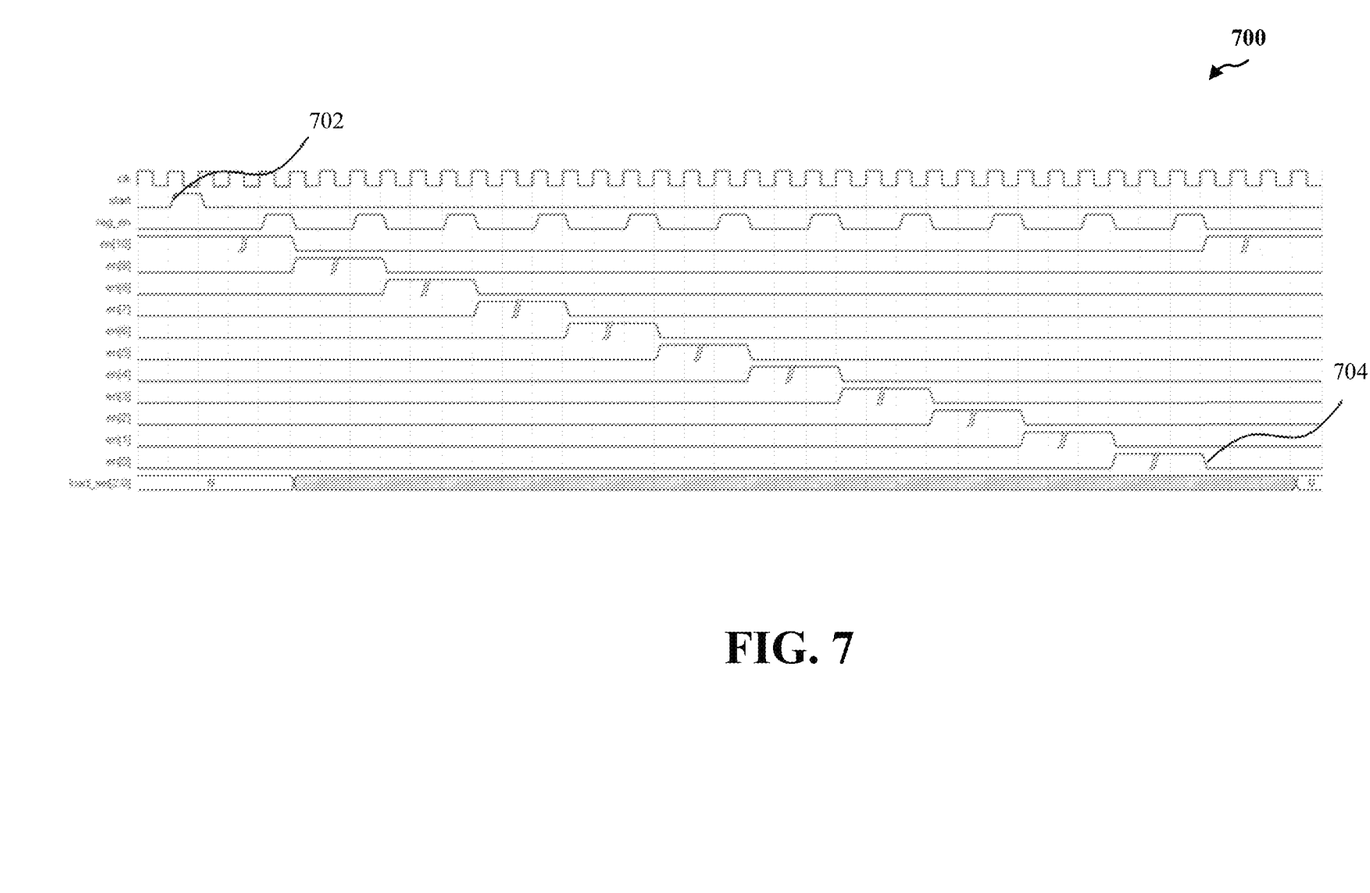
FIG. 7 is a timing diagram illustrating multiplexer's control pulse generation according to an exemplary embodiment.

FIG. 7 is a timing diagram 700 illustrating multiplexer's control pulse generation according to an exemplary embodiment. As noted above, the control block 604 shown in FIG. 6 generates all the pulses for the hybrid multiplexer 408 to multiplex 132, 264 or 528 parallel ADC data outputs to a single data stream. The control block 604 is configured to initiate pulse generation on a rising edge 702 of the start pulse signal, even when a multiplexing sequence is in progress. The next sequence can be started after the falling edge 704 of enable [0] signal. This implementation provides an opportunity to concatenate multiplexing sequences without wait-states.

Figure 8:
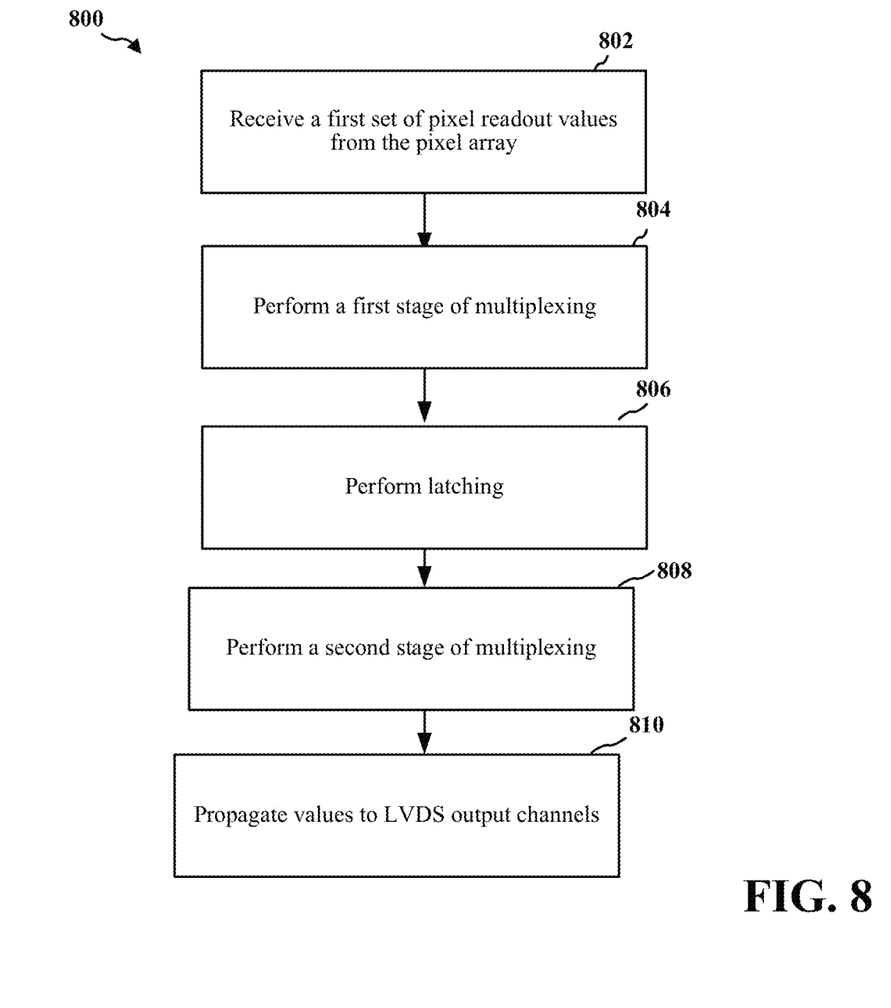
FIG. 8 is a flowchart of a method performed in a hybrid output multiplexer according to an exemplary embodiment.

FIG. 8 is a flowchart 800 of a method of performing a multistage multiplexing of pixel values of a CMOS image sensor. The method may be performed by an apparatus that includes one or more hybrid output multiplexers 508 as described above. The CMOS image sensor may include a pixel array, which may include a multitude of shared pixels as also described above. At 802, the apparatus may read out a first set of pixel values from the column ADCs 306. The first pixel may include, for example, a first pixel value from the first pixel may be read out from a first one of the photodiodes of the first plurality of photodiodes (e.g., $A_n$), a second pixel value may be read out from a first one of the photodiodes of the second plurality of photodiodes (e.g., $D_{n-1}$), and so on.

At 804, the apparatus may perform a first stage of multiplexing. In one configuration, this stage may involve twelve 11:1 tristate multiplexers 602. Each tristate multiplexer 602 selects one of the 11 inputs based on the provided select signal.

At 806, the apparatus may perform latching. In one configuration, this stage may involve a plurality of digital registers 606 latching values provided by the 11:1 multiplexers 602. This stage allows the next values for the tristate multiplexers 602 to settle.

At 808, the apparatus may perform a third stage of multiplexing. In one configuration, this stage may involve two 6:1 multiplexers 610. Each 6:1 multiplexer 610 selects one of the 6 outputs obtained during first stage.

At 810, the apparatus may use the 2:1 multiplexer as a daisy chaining option to propagate multiplexing results to a plurality of LVDS output channels. In one configuration, the image sensor 500 has 32 LVDS outputs 510 with programmable serialization factors. The maximum output data rate of such image sensor 500 is 1.8 Gb/s per LVDS-channel.

Figure 9:
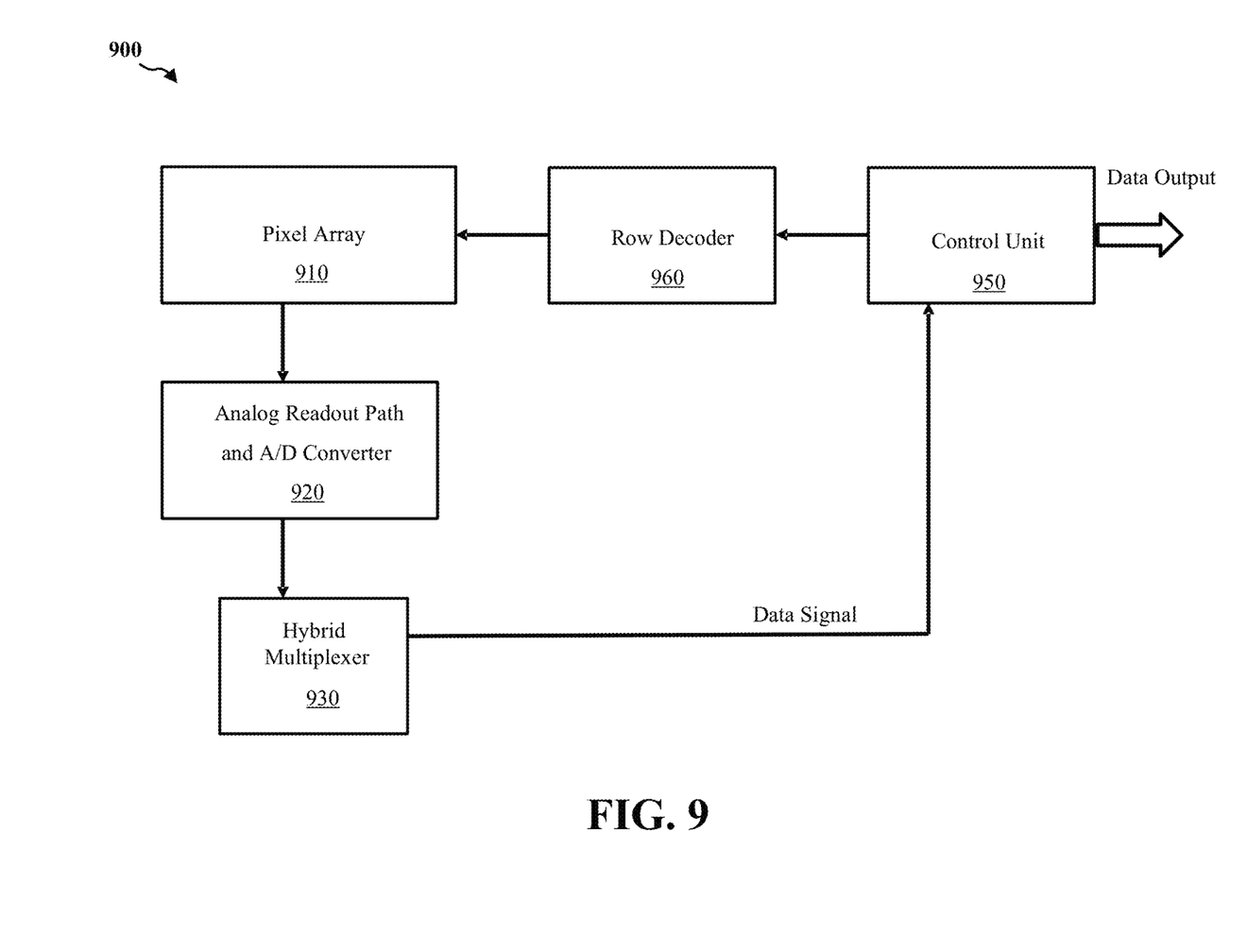
FIG. 9 illustrates a block diagram of a CMOS image sensor according to an exemplary embodiment.

FIG. 9 illustrates a block diagram of a CMOS image sensor according to an exemplary embodiment. As shown, the CMOS image sensor 900 includes a pixel array 910, which can be, for example, pixel array 300 described above that includes a multitude of 4T shared pixel configurations. Furthermore, the output of the pixel array 910 may be fed to an analog readout path and A/D converter 920, which is provided for processing the analog output voltages from the pixel array 910 to convert analog pixel signals into digital signals. It should be understood that the analog readout path and A/D converter 920 can correspond to the columns of ADCs 506 as described above.

As shown in FIG. 9, the output of the A/D converter 920 may be fed to a hybrid multiplexer 930 for selecting among obtained pixel read out values. It should be appreciated that the hybrid multiplexer 930 may be configured to perform a multistage multiplexing operation described above. In one configuration, the hybrid output multiplexer 930 has only two registers running at the highest clock rate and 12 registers running at the highest clock rate divided by 12.

Moreover, a control unit 950 is provided for providing control signals used in controlling the aforementioned units (e.g., the A/D converter 920 and hybrid multiplexer 930 timing) and outputting data to the outside (e.g., a display unit) through an interface. For example, the control unit 950 in conjunction with row decoder 960 can generate the activating signals. Moreover, in one embodiment, the control unit 950 can also generate the control signals to open and close the switches of the capacitor readout.

The control unit 950 may include one or more processors and one or more modules for executed the control algorithms described herein. The modules may be software modules running in the processor, or resident/stored in memory, one or more hardware modules coupled to the processor, or some combination thereof. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Furthermore, the control unit 950 may be coupled to a row decoder 960 that is configured to output the signals for selecting the rows in the pixel array 910 based on a control signal transmitted from the control unit 950.

Preferably, the analog readout path and A/D converter 920 may include comparators as many as the number of columns of the pixel array 910 as described above. Each of the comparators serves a role of converting an analog pixel value of a column in which it is located into a digital signal. A plurality of digital signals are loaded into the hybrid multiplexer 930. The digital signals are subjected to an image processing by the control unit 950 and then, sequentially outputted through output pins of the image sensor in the image processed order.

In one refinement of the exemplary configuration disclosed above, and to reduce interconnections in the pixel or pixel array, two transfer gates belonging to two different shared pixels (e.g., two shared pixels on two adjacent rows) may be connected. As a result, two floating diffusions of the two shared pixels are read out at the same time (e.g., during the same readout period). In this configuration, by cross coupling two transfer gates on two different rows, two shared pixels may be operated in parallel. This configuration may reduce the amount of wiring needed for the vertical shift registers for addressing the pixels or sub-pixels. For example, for a shared pixel with four photodiodes, the number of interconnections to address the shared pixel may be reduced from four wires to two wires. With reduced wiring in the shared pixel, the pixel performance (e.g., conversion gain, fill factor, sensitivity of the shared pixel) may improve due to lower complexity in wiring.

It should be appreciated that in the examples above, all switching signals are assumed to be positive logic signals, i.e. a high level, or "1" results in closing the switch. It is, however, also possible to use an inverted logic, or to use both, positive and negative, logic in a mixed manner. Moreover, the disclosed CMOS image sensor and method provides an increased speed of the overall readout circuit. In one aspect, the increase in the speed of the readout circuit allows for an increase in the number of pixels in a matrix, which is a key feature for ultra-high definition imaging, for example.

While aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

The previous description is provided to enable any person skilled in the art to fully understand the full scope of the disclosure. Modifications to the various exemplary embodiments disclosed herein will be readily apparent to those skilled in the art. Thus, the claims should not be limited to the various aspects of the disclosure described herein, but shall be accorded the full scope consistent with the language of claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in jurisdictions other than the United States, unless the element is expressly recited using the phrase "means for" or, in the case of a method claim, the element is recited using the phrase "step for."

What is claimed is:

1. An imaging system comprising:
   a pixel array including a plurality of columns having a plurality of rows of pixels, with each pixel having a plurality of photodiodes and a common readout circuit configured to store respective accumulation voltages from each of the plurality of photodiodes;
   row driver circuitry configured control the pixel array for pixel addressing and readout;
   an image sensor controller configured to control the row driver circuitry to address the plurality of rows of pixels in the pixel array, such that the respective accumulation voltages of at least a portion of photodiodes of the plurality of rows is concurrently read out on a readout channel coupled to at least one bit line column;
   a plurality of analog to digital converters coupled to the at least one bit line column and configured to convert output signals from the pixel array to a plurality of digital signals that correspond to the respective accumulation voltages of the at least portion of photodiodes of the plurality of rows; and
   a hybrid multiplexer configured to multiplex and route the plurality of digital signals to a video imaging device to be displayed thereon,
   wherein the hybrid multiplexer comprises:
      a first stage including a plurality of tristate multiplexers;
      a second stage including a plurality of registers configured to receive digital output signals from the first stage and store values therein; and
      a third stage including at least one digital multiplexer coupled to the plurality of registers and configured to serially route the digital output signals from the second stage to a control unit for producing a digital image of image data captured by the pixel array on the video imaging device,
      wherein the second stage of the hybrid multiplexer is configured to store the digital output signals to provide a settling time for the first stage to receive a next value of the plurality of digital signals output from the plurality of analog to digital converters,
      wherein the third stage of the hybrid multiplexer is configured to daisy chain the respective outputs of the first and second stages to multiplex the plurality of digital signals to the control unit,
      wherein the first stage of the hybrid multiplexer includes a plurality of 11:1 tristate multiplexers, and
      wherein the third stage of the hybrid multiplexer includes at least one 6:1 digital multiplexer.

2. The imaging system according to claim 1, wherein the plurality of rows of pixels comprises a linear configuration and has a symmetrical layout that is identical to one another other.

3. The imaging system according to claim 1, wherein each pixel in the pixel array comprises a plurality of transfer gates that are each coupled to a corresponding photodiode of the plurality of photodiodes and the common readout circuit is further configured to output the accumulation voltage of each of the plurality of photodiodes to the readout channel.

4. An imaging system comprising:
   a pixel array including a plurality of columns having a plurality of rows of pixels, with each pixel having a plurality of photodiodes and a common readout circuit configured to store respective accumulation voltages from each of the plurality of photodiodes;
   row driver circuitry configured control the pixel array for pixel addressing and readout, such that the respective accumulation voltages of at least a portion of photodiodes of the plurality of rows is concurrently read out on a readout channel coupled to at least one bit line column;
   a plurality of analog to digital converters coupled to the at least one bit line column and configured to convert output signals from the pixel array to a plurality of digital signals that correspond to the respective accumulation voltages of the at least portion of photodiodes of the plurality of rows; and
   a hybrid multiplexer configured to multiplex and route the plurality of digital signals to a video imaging device to be displayed thereon,
   wherein the hybrid multiplexer comprises:
      a first stage including a plurality of tristate multiplexers;
      a second stage including a plurality of registers configured to receive digital output signals from the first stage and store values therein; and
      a third stage including at least one digital multiplexer coupled to the plurality of registers and configured to serially route the digital output signals from the second stage to a control unit for producing a digital image of image data captured by the pixel array on the video imaging device,
      wherein the second stage of the hybrid multiplexer is configured to store the digital output signals to provide a settling time for the first stage to receive a next value of the plurality of digital signals output from the plurality of analog to digital converters.

5. The imaging system according to claim 4, further comprising an image sensor controller configured to control the row driver circuitry to address the plurality of rows of pixels in the pixel array.

6. The imaging system according to claim 4, wherein the third stage of the hybrid multiplexer is configured to daisy chain the respective outputs of the first and second stages to multiplex the plurality of digital signals to the control unit.

7. The imaging system according to claim 4, wherein the first stage of the hybrid multiplexer includes a plurality of 11:1 tristate multiplexers, and wherein the third stage of the hybrid multiplexer includes at least one 6:1 digital multiplexer.

8. The imaging system according to claim 4, wherein the plurality of rows of pixels comprises a linear configuration and has a symmetrical layout that is identical to one another other.

9. The imaging system according to claim 4, wherein each pixel in the pixel array comprises a plurality of transfer gates that are each coupled to a corresponding photodiode of the plurality of photodiodes and the common readout circuit is further configured to output the accumulation voltage of each of the plurality of photodiodes to the readout channel.

10. An imaging system comprising:
    a pixel array including a plurality of columns having a plurality of rows of pixels, with each pixel having a plurality of photodiodes and a common readout circuit configured to store respective accumulation voltages from each of the plurality of photodiodes;

row driver circuitry configured control the pixel array for pixel addressing and readout, such that the respective accumulation voltages of at least a portion of photodiodes of the plurality of rows is read out on a readout channel coupled to at least one bit line column;

a hybrid multiplexer configured to multiplex and route a plurality of output signals from the pixel array to a video imaging device to be displayed thereon, wherein the hybrid multiplexer comprises:

a first stage including a plurality of tristate multiplexers;

a second stage including a plurality of registers configured to receive digital output signals from the first stage and store values therein; and a third stage including at least one digital multiplexer coupled to the plurality of registers and configured to serially route the digital output signals from the second stage to a control unit for producing a digital image of image data captured by the pixel array on the video imaging device.

11. The imaging system according to claim 10, further comprising a plurality of analog to digital converters coupled to the at least one bit line column and configured to convert the plurality of output signals from the pixel array to a plurality of digital signals that correspond to the respective accumulation voltages of the at least portion of photodiodes of the plurality of rows.

12. The imaging system according to claim 11, wherein the second stage of the hybrid multiplexer is configured to store the digital output signals to provide a settling time for the first stage to receive a next value of the plurality of digital signals output from the plurality of analog to digital converters.

13. The imaging system according to claim 10, further comprising an image sensor controller configured to control the row driver circuitry to address the plurality of rows of pixels in the pixel array.

14. The imaging system according to claim 10, wherein the third stage of the hybrid multiplexer is configured to daisy chain the respective outputs of the first and second stages to multiplex the plurality of digital signals to the control unit.

15. The imaging system according to claim 14, wherein the first stage of the hybrid multiplexer includes a plurality of 11:1 tristate multiplexers, and wherein the third stage of the hybrid multiplexer includes at least one 6:1 digital multiplexer.

16. The imaging system according to claim 10, wherein the plurality of rows of pixels comprises a linear configuration and has a symmetrical layout that is identical to one another other.

17. The imaging system according to claim 10, wherein each pixel in the pixel array comprises a plurality of transfer gates that are each coupled to a corresponding photodiode of the plurality of photodiodes and the common readout circuit is further configured to output the accumulation voltage of each of the plurality of photodiodes to the readout channel.

* * * * *